United States Patent [19]
Zifferer

[11] 3,848,506
[45] Nov. 19, 1974

[54] EXPANSION ANCHOR

[76] Inventor: Kenneth B. Zifferer, c/o Expansion Bolt Company, 500 State St., York, Pa. 17405

[22] Filed: Dec. 15, 1972

[21] Appl. No.: 315,546

[52] U.S. Cl. .................................................. 85/83
[51] Int. Cl. .......................................... F16b 13/06
[58] Field of Search .............. 85/83, 84, 82, 74, 73, 85/79, 87, 75, 76, 63, 67; 151/19 R

[56] References Cited
UNITED STATES PATENTS

| | | | |
|---|---|---|---|
| 696,587 | 4/1902 | Palmer | 85/83 |
| 1,051,444 | 1/1913 | Pleister | 85/83 |
| 2,508,409 | 5/1950 | Lord | 151/19 R |
| 2,760,399 | 8/1956 | Rea | 85/73 X |
| 3,450,243 | 6/1969 | Kraeling | 85/79 X |
| 3,522,755 | 8/1970 | Mitchell | 85/87 X |
| 3,742,809 | 7/1973 | Zifferer | 85/84 |

FOREIGN PATENTS OR APPLICATIONS

| | | | |
|---|---|---|---|
| 417,651 | 10/1934 | Great Britain | 85/83 |
| 346,785 | 7/1960 | Switzerland | 85/84 |

*Primary Examiner*—Ramon S. Britts
*Attorney, Agent, or Firm*—Stoll and Stoll

[57] ABSTRACT

An expansion anchor comprising a bolt with a conically tapered and threaded tip and an internally tapered and threaded expansion sleeve which is engageable therewith. The radii of curvature of the bolt tip and expansion sleeve along their respective longitudinal axes are out of phase until the bolt tip is substantially fully threaded into the expansion sleeve and substantial expansion is attained, at which time their respective radii of curvature will substantially coincide. Prior to expansion, the expansion sleeve has substantially the same outer diameter as the shank of the bolt.

18 Claims, 21 Drawing Figures

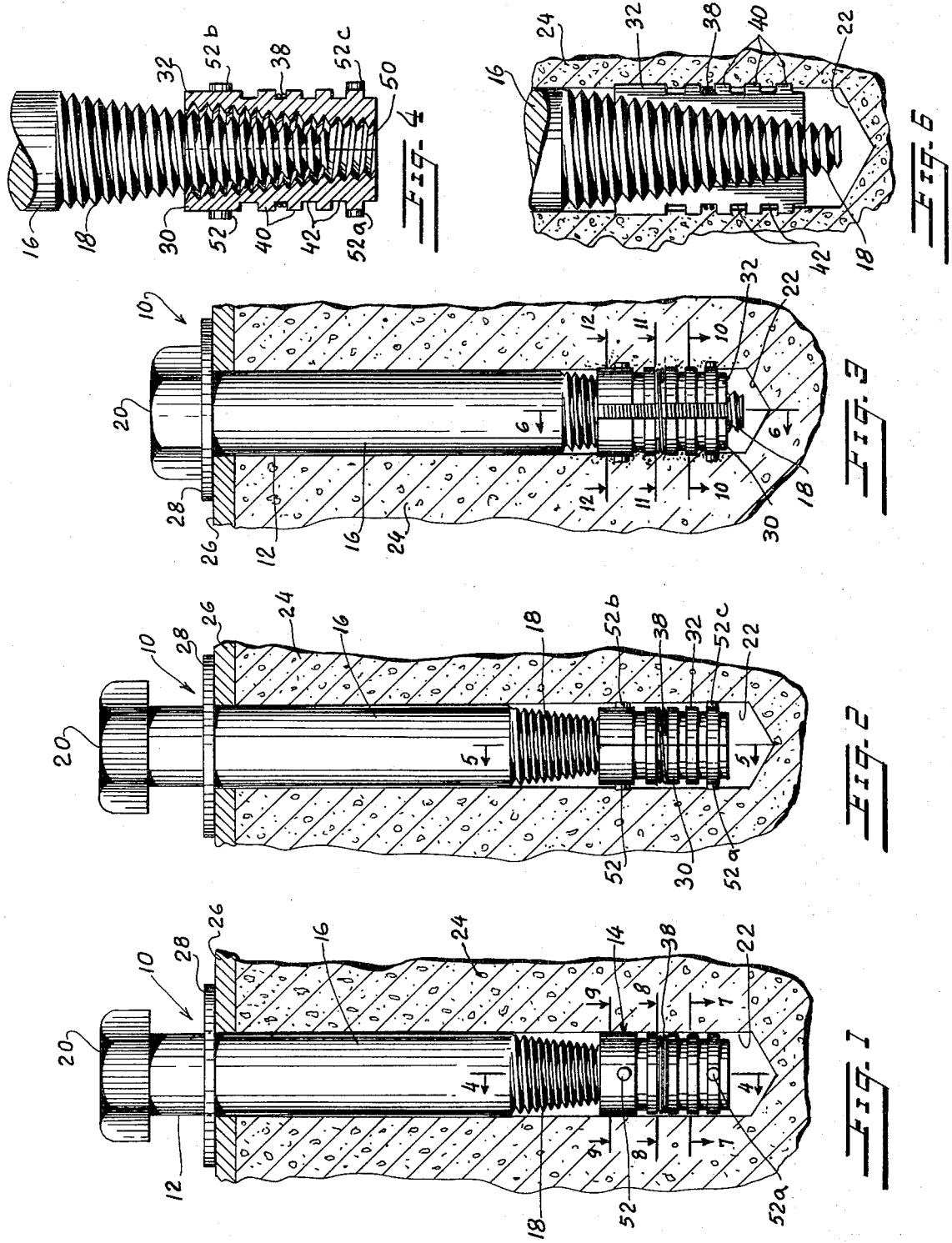

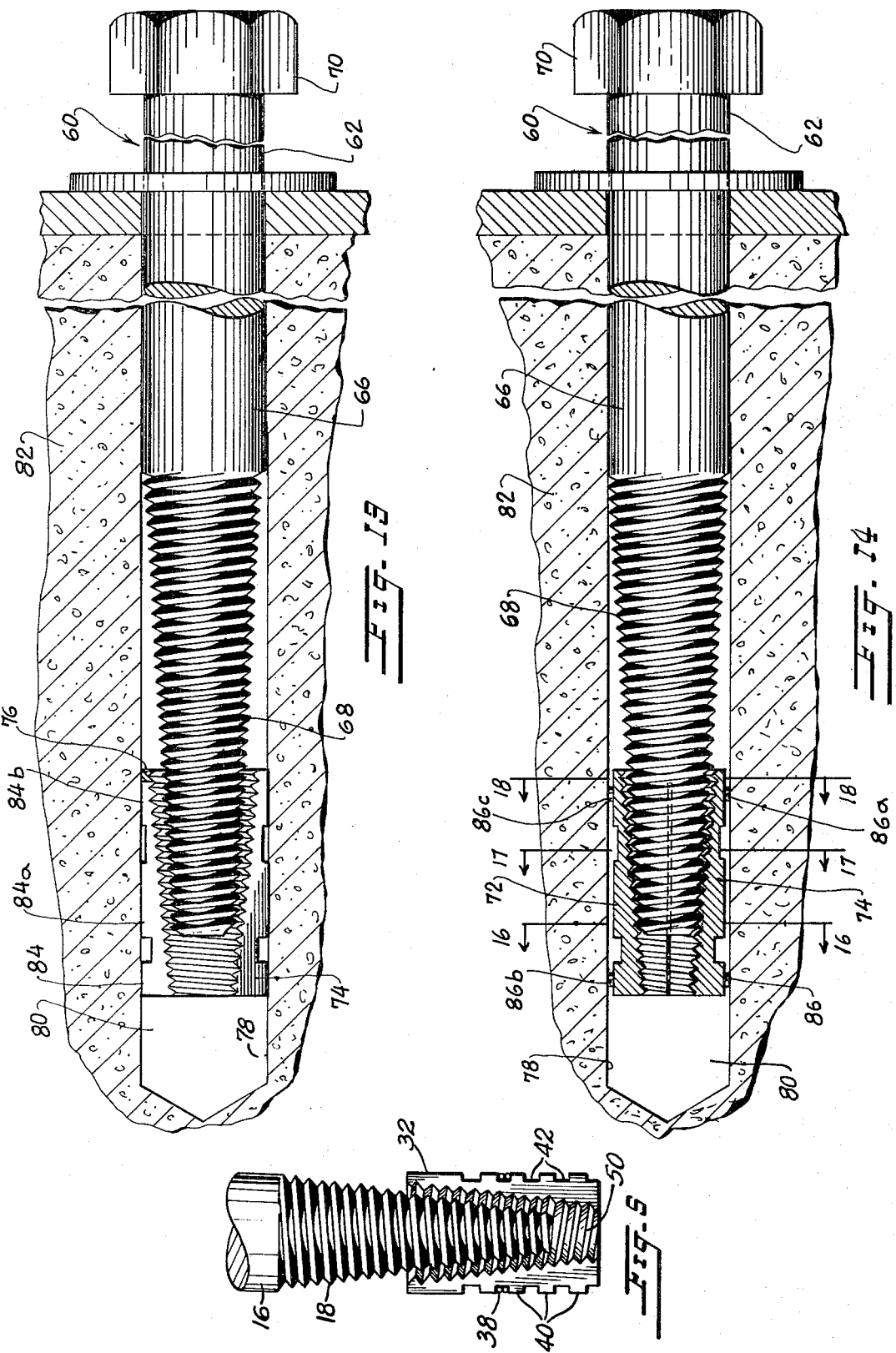

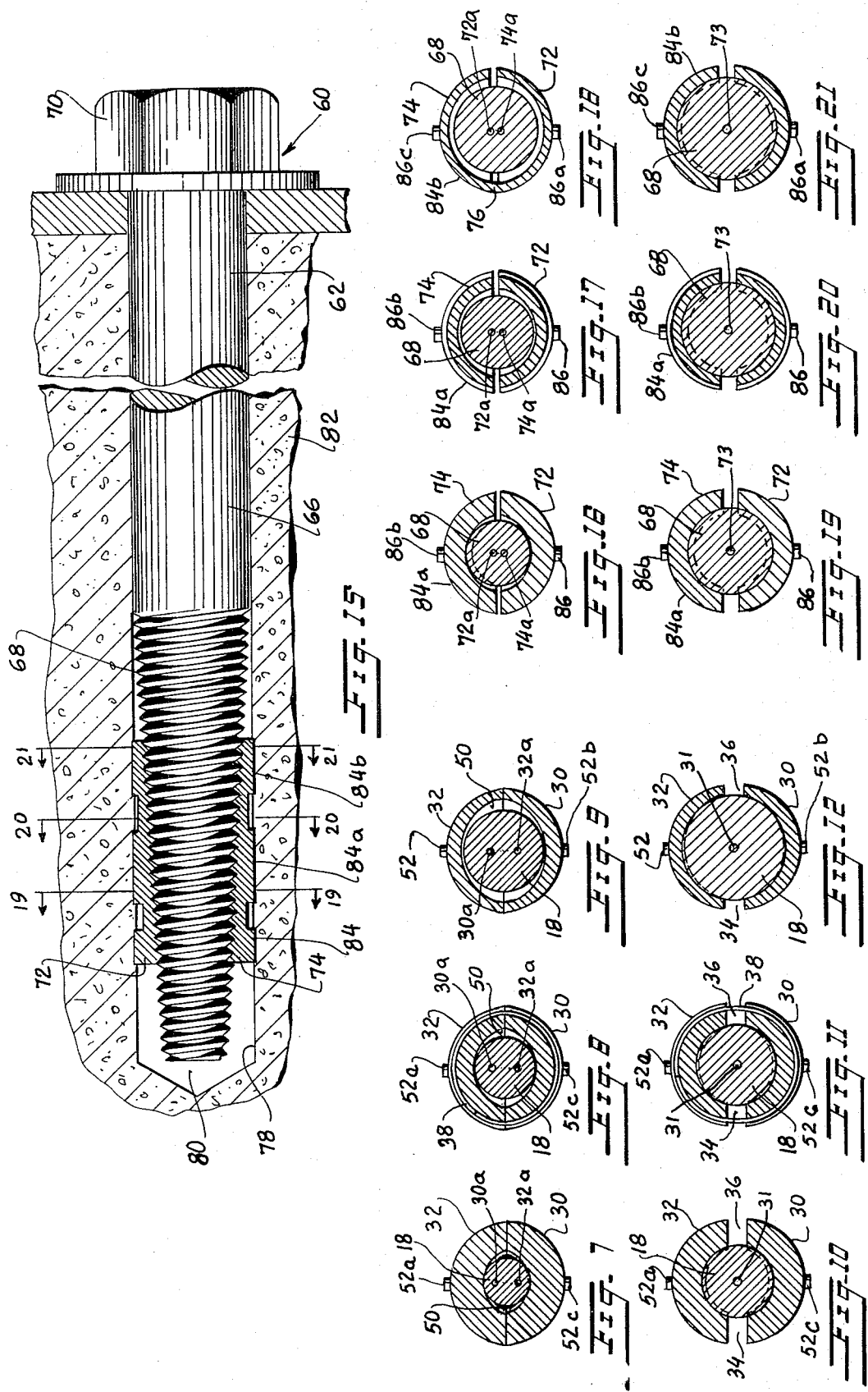

EXPANSION ANCHOR

BACKGROUND OF THE INVENTION

Field of the Invention

Expansion anchors for use in concrete and masonry floors, walls, ceilings and the like.

SUMMARY OF THE INVENTION

This invention constitutes an improvement over the invention disclosed and claimed in applicant's pending patent application Ser. No. 168,809, filed Aug. 4, 1971, now U.S. Pat. No. 3,742,809, issued July 3, 1973. The expansion anchor set forth in said co-pending patent application comprises a bolt having a conically tapered and threaded expansion sleeve which receives said conically tapered and threaded bolt tip in screw-threaded engagement therewith. The outer diameter of the expansion sleeve corresponds substantially to the diameter of the bolt. The conical taper of the bolt tip corresponds to the conical taper of the expansion sleeve.

The tapered threaded sleeve, in said co-pending patent application, matches the tapered, threaded bolt tip, in terms of their respective radii of curvature along their respective longitudinal axes when they are initially interengaged. Mismatching of their respective radii of curvature will result when the bolt tip is threaded further into the expansion sleeve. Maximum mismatching will occur at full engagement between said bolt tip and said expansion sleeve, and at maximum expansion of said expansion sleeve.

The present invention also provides a bolt having a conically tapered and threaded tip, and an internally tapered and threaded expansion sleeve which is engageable with said bolt tip. The outer diameter of the expansion sleeve also corresponds, substantially, to the diameter of the bolt. However, in the present invention the radii of curvature of the expansion sleeve at the time of initial engagement between them. It is not until the bolt tip is threaded into the expansion sleeve sufficiently to fully engage and substantially expand said expansion sleeve, that their respective radii of curvature are in phase. Stated succinctly, when the bolt tip is fully engaged with the expansion sleeve, their respective radii of curvature will coincide.

The expansion sleeve has a variable, adjustable taper which enables it to conform to the taper of the bolt tip. This adjustability results from dividing the expansion sleeve into a plurality of longitudinally extending parts which are resiliently held together. As the bolt tip is progressively threaded into the expansion sleeve, the longitudinally extending parts are forced radially outwardly to expand the expansion sleeve. Concurrently, and to the extent necessary, these longitudinally extending parts also adjust their angle of taper to the taper of the bolt tip.

Another important aspect of the invention resides in the preferred use of different materials for the bolt and expansion sleeve components. The expansion sleeve should be made of relatively deformable material such as conventional lead or zinc alloys and malleable iron. The bolt should be made of material such as steel, which is relatively resistant to deformation. Consequently, when expansion of such expansion sleeve results in its compression between the bolt tip and the wall of an anchorage bore hole, the malleability of the expansion sleeve material will enable it to conform fully to the configuration of the bolt tip, and produce close meshing between their respective screw threads.

BRIEF DESCRIPTION OF THE DRAWING

FIG. 1 is a fragmentary view partly in section showing an expansion anchor made in accordance with one form of this invention inserted into a bore hole in an anchorage, said expansion anchor being shown prior to full engagement between the bolt and the expansion sleeve and prior to expansion of said expansion sleeve.

FIG. 2 is a view similar to that of FIG. 1, except taken in a plane shifted 90° from the plane of FIG. 1.

FIG. 3 is a view similar to that of FIG. 2, except that the bolt is shown fully engaged with the expansion sleeve and showing the expansion sleeve in expanded condition.

FIG. 4 is an enlarged fragmentary view partly in section taken on the line 4—4 of FIG. 1.

FIG. 5 is a view similar to that of FIG. 4 except that it is a section taken on the line 5—5 of FIG. 2.

FIG. 6 is a view similar to that of FIGS. 4 and 5, except that it is a section taken on the line 6—6 of FIG. 3.

FIG. 7 is a transverse section on the line 7—7 of FIG. 1.

FIG. 8 is a transverse section on the line 8—8 of FIG. 1.

FIG. 9 is a transverse section on the line 9—9 of FIG. 1.

FIG. 10 is a transverse section on the line 10—10 of FIG. 3.

FIG. 11 is a transverse section on the line 11—11 of FIG. 3.

FIG. 12 is a transverse section on the line 12—12 of FIG. 3.

FIG. 13 is an enlarged fragmentary view partly in section showing an expansion anchor made in accordance with a second form of this invention, said expansion anchor being shown inserted into a bore hole in an anchorage prior to full engagement between the bolt and the expansion sleeve and prior to expansion of said expansion sleeve.

FIG. 14 is a view similar to that of FIG. 13, except that the section is shifted 90° from the plane of the section in FIG. 13.

FIG. 15 is a view similar to that of FIG. 14 but showing the bolt fully engaged with the expansion sleeve and showing the expansion sleeve in expanded condition.

FIG. 16 is a transverse section on the line 16—16 of FIG. 14.

FIG. 17 is a transverse section on the line 17—17 of FIG. 14.

FIG. 18 is a transverse section on the line 18—18 of FIG. 14.

FIG. 19 is a transverse section on the line 19—19 of FIG. 15.

FIG. 20 is a transverse section on the line 20—20 of FIG. 15.

FIG. 21 is a transverse section on the line 21—21 of FIG. 15.

DESCRIPTION OF PREFERRED EMBODIMENTS OF THE INVENTION

Referring now to the details of the first embodiment of the invention, as illustrated in FIGS. 1 – 12 of the drawing, it will be observed that expansion anchor 10 comprises a bolt 12 and an expansion sleeve 14. The bolt has a generally cylindrical shank 16, a conically tapered and threaded tip 18 at one end of said shank, and torque tool engageable means at the opposite end of said shank, for example, hexagonally shaped head 20. It will, of course, be understood that said torque tool engageable means may also function as workpiece engageable means.

In the illustrated form of this invention the expansion anchor is mounted in a bore hole 22 formed in a concrete anchorage 24, and a metal plate 26 is a workpiece which is engageable between the head of the bolt and the concrete anchorage. A washer 28 may be interposed between said bolt head and said plate.

Expansion sleeve 14 has a generally cylindrical outer configuration, particularly when in expanded condition, it is internally tapered and threaded, and it is longitudinally slit. More particularly, the expansion sleeve is slit longitudinally on diametrically opposite sides to form two coacting parts of equal size and configuration. Actually, this is purely illustrative, since the expansion sleeve may be slit more than twice to form more than two coacting component parts. In the illustrated form of the invention, the expansion sleeve is slit twice to form two component parts of equal configuration and dimensions.

As illustrated in FIGS. 1 – 12 of the drawing, the two parts of the expansion sleeve are designated 30 and 32, respectively, and the slits which are provided between them are designated with the reference numerals 34 and 36, respectively. What holds the two parts of the expansion sleeve together is, in the illustrated form of this invention, a split spring ring 38 with overlapping ends. More particularly, the expansion sleeve is provided on its outer surface with a plurality of arcuate concentric ribs 40 defining a plurality of arcuate grooves or channels 42 between them. The split ring 38 is mounted in one of said arcuate grooves to hold the two parts of the expansion sleeve together. Obviously, the split spring is expansible to allow expansion of the expansion sleeve.

It will be apparent from the cross-sectional views of FIGS. 7 – 12 that the two component parts 30 and 32 of the expansion sleeve are generally arcuately shaped in cross-section. It will also be apparent from these sectional views, as well as the sectional views of FIGS. 4 – 6, that the expansion sleeve is provided with a tapered and threaded inner wall 50. More particularly, since the expansion sleeve consists of two parts, 30 and 32, its inner configuration defines two separate walls, each arcuately shaped in inside cross-section and each longitudinally tapered in longitudinal section.

Since the bolt tip 18 is conically tapered and threaded, it will have a circular cross-section at all points along its longitudinal axis. The radius of curvature of the conically tapered bolt tip will vary progressively along the length of the axis. Stated differently, the conically tapered bolt tip is provided with a plurality of progressively increasing radii of curvature, starting at the smaller end of said bolt tip and continuing to the cylindrical shank of the bolt.

The inner threaded wall 50 of the expansion sleeve is also tapered with progressively increasing radii of curvature, beginning at one end of the expansion sleeve (the lower end as viewed in FIGS. 4 and 5) and continuing to the opposite end thereof (the upper end as viewed in said FIGS. 4 and 5). The progressively increasing radii of curvature of the expansion sleeve correspond to the progressively increasing radii of curvature of the conically tapered and threaded bolt tip 18 in the general area of full threaded engagement between said expansion sleeve and said bolt tip, with consequent substantial expansion of the expansion sleeve. This relationship is illustrated in FIGS. 3, 6 and 10–12. Stated differently, the radii of curvature of the expansion sleeve match the radii of curvature of the bolt tip only when the bolt tip is fully engaged with the expansion sleeve and the expansion sleeve is in substantially expanded condition on said bolt tip. It follows that the radii of curvature of the expansion sleeve would not match the radii of curvature of the bolt tip when the two are not fully engaged and when the expansion sleeve is not substantially expanded.

The relationship between the expansion sleeve and the bolt tip prior to engagement between them and prior to substantial expansion of the expansion sleeve is illustrated in FIGS. 1, 2, 4, 5 and 7–9 of the drawing. The bolt tip and expansion sleeve are shown in these figures of the drawing in initial and only partial engagement with each other. The expansion sleeve is not substantially expanded. Indeed, at this stage of the operation, the outer diameter of the expansion sleeve corresponds, substantially, to the diameter of the shank of the bolt. In the normal use of the present device, bore hole 22 in concrete abutment 24 would be drilled to a diameter corresponding to the diameter of the shank of the bolt, with just enough clearance to enable the bolt to be tapped or driven into the bore hole. Since the initial diameter of the expansion sleeve would correspond to the diameter of the shank of the bolt, it would similarly be possible to insert the expansion sleeve into a bore hole of the prescribed diameter. This might conveniently be done by inserting the bolt tip into the expansion sleeve to a depth sufficient for initial screw-threaded engagement between them and then tapping the entire assembly into the bore hole.

It will also be understood (see FIGS. 1 and 2) that this arrangement makes it possible to place a workpiece on the concrete anchorage before the bore hole is drilled therein. The bore hole would conveniently be drilled by inserting the drill bit through a pre-formed hole in the workpiece and then drilling into the concrete anchorage. This would insure alignment between the hole in the workpiece and the hole in the anchorage, and the bolt with its expansion sleeve could then be inserted through the hole in the workpiece and into the hole in the anchorage. This method of use of the present invention would eliminate the problem of aligning a pre-formed hole in the workpiece with a pre-formed hole in the anchorage.

It is evident from FIGS. 7, 8 and 9 that the curvature of the threaded internal wall of the expansion sleeve is out of phase with the curvature of the bolt tip at the time of initial engagement between said expansion sleeve and said bolt tip. As viewed in FIGS. 7 – 9, the radii of curvature of the expansion sleeve are greater than the radii of curvature of the bolt tip in the area of initial engagement between them. However, there is partial engagement between the threads of the bolt tip and the threads of the expansion sleeve sufficient to enable the bolt tip to thread its way into full engagement with the expansion sleeve when a torque tool is applied to the head of the bolt. The bolt tip is thereby caused to move from its out-of-phase relationship with the threads of the expansion sleeve into its in-phase relationship therewith as illustrated in FIGS. 10 – 12 of the drawing. During this transition from out-of-phase to in-phase threaded relationship, the expansion sleeve is caused to expand from its original non-expanded condition as illustrated in FIGS. 1, 2, 4, 5 and 7–9 to its expanded condition as illustrated in FIGS, 3, 6 and 10–12. As the bolt tip is thus threaded into the expansion sleeve from its position in FIGS. 1 and 2 to its position in FIG. 3, the bolt moves inwardly through the bore hole to a position wherein the head of the bolt engages washer 28 and causes said washer to bear tightly against the workpiece 26. The bolt is now fully engaged with the expansion sleeve and thereby tightly anchored in the concrete anchorage; the bolt is also tightly engaged with the workpiece, and said workpiece is thereby also firmly secured to the anchorage.

Important features of the invention should now be noted. What makes the above described operation possible is the fact that the expansion sleeve is adapted to assume the different positions illustrated by FIGS. 7–9 on the one hand and FIGS. 10–12 on the other hand. The two component arcuate parts 30 and 32 of the expansion sleeve do not extend a full 360° around their longitudinal axis. When they are in contacting relationship (prior to expansion) their threaded inner walls have spaced axes of curvature 30a and 32a respectively.

When the expansion sleeve is expanded, that is, when the two component parts are wedged apart (as shown in FIGS. 3, 6 and 10–12) their threaded walls have a common axis of curvature. Stated differently, prior to expansion the two component parts 30 and 32 are not in concentric relation either with each other or with the bolt tip. However, when the bolt tip is fully engaged with the expansion sleeve and the expansion sleeve is substantially expanded (as in FIGS. 3, 6 and 10–12) said component arcuate parts 30 and 32 are concentrically related to each other and to the bolt tip with a common axis of curvature 31.

It is also important to note that bolt 16 is made, preferably, of relatively non-malleable material such as steel, whereas the expansion sleeve is made of relatively malleable material such as of conventional zinc alloys. Such being the case, the expansion sleeve will deform, when required and under severe compression, to the curvature of the bolt tip. This condition would occur in a bore hole formed in an anchorage of relatively non-compressible material, wherein the bolt tip is caused to penetrate the expansion sleeve to a depth greater than is shown in FIGS. 3, 6 and 10–12 of the drawing. When the expansion sleeve is caused to ride up the bolt tip to the point where the threads terminate, the curvature of the threading walls of component parts 30 and 32 will again be out of phase with the curvature of the bolt tip. At this time the expansion sleeve will achieve its fullest measure of expansion. If this should occur in a bore hole formed in an anchorage made of relatively non-compressible material, the result will be that the component parts of the expansion sleeve will be tightly compressed between the bolt tip on the one hand and the wall of the bore hole on the other. This will cause said component parts to conform to the curvature of the bolt tip.

Two features concerning the outer configuration of the expansion sleeve may now be mentioned. Prior to expansion the expansion sleeve does not describe a mathematically precise cylinder in its outer configuration. It is only when the expansion sleeve is in full engagement with the bolt tip and the expansion sleeve is substantially expanded (as shown in FIGS. 3, 6 and 10–12) that the outer configuration of the expansion sleeve (except for slits 34 and 36) defines a cylinder. However, radially extending projections 52, 52a, 52b and 52c on said component parts 30 and 32 sufficiently complement the non-cylindrical configuration of the unexpanded expansion sleeve to effectively define a cylinder. That is, a diametric line extending from projection 52 to projection 52b (or from projection 52a to projection 52c) would correspond to the diameter of the expansion sleeve taken on a line which intersects either of the aforementioned diametric lines at right angles. This is evident from a comparison of FIGS. 1 and 2 of the drawing, where it is seen that unexpanded expansion sleeve 14 effectively fills cylindrical bore hole 22 in concentric relation therewith.

Projections 52, 52a, 52b and 52c perform at least two functions. In the unexpanded condition of the expansion sleeve (FIGS. 1 and 2) these projections help to center the expansion sleeve in the bore hole. When the expansion sleeve is expanded (FIG. 3) said projections project into the wall of the bore hole and help to anchor the expansion sleeve therein. At the time of initial expansion of the expansion sleeve, projections 52, 52a, 52b and 52c will engage the wall of the bore hole sufficiently to prevent unintentional rotation of the expansion sleeve when the bolt is rotated therein. There is nothing critical about the shape of projections 52, 52a, 52b and 52c. They are shown in the form of cylindrical studs, and this is the preferred configuration. However, any other configuration which would resist rotation of the expansion sleeve in the bore hole at the time of initial expansion of said expansion sleeve will suffice for the purposes of this invention.

Arcuate ribs 40 perform the function of help to anchor the expansion sleeve to the anchorage. This is illustrated in FIGS. 3 and 6, where the expansion sleeve is shown in expanded condition and ribs 40 are shown pressed into the cylindrical wall of the bore hole.

Turning now to the second form of the invention as illustrated in FIGS. 13, 14, 15 and 16–21, it will be observed that expansion anchor 60 comprises a bolt 62 and an expansion sleeve 64. Bolt 62 has a cylindrical shank 66, a conically tapered and threaded bolt tip 68 at one end of said shank, and a torque tool engaging head 70 at the opposite end of the shank. As will be seen, the only significant difference between bolt 62 and bolt 16 resides in the fact that bolt tip 68 has a relatively smaller taper and a relatively larger longitudinal dimension than bolt tip 18. Expansion sleeve 64 consists of two component parts 72 and 74, respectively, said parts being held together by a narrow neck or web 76. In this embodiment of the invention, connecting neck or web 76 substitutes for the split spring ring 38 in holding the component parts of the expansion sleeve together.

Expansion sleeve 64 is internally tapered to receive the threaded bolt tip 68. It will, however, be noted that the angle of taper of expansion sleeve 64 is different, that is, larger, than the angle of taper of bolt tip 68. By reason of the foregoing, when the bolt tip is inserted into the expansion sleeve only the smaller end of the bolt tip engages the expansion sleeve in screw-threaded engagement therewith. It is only when the expansion sleeve rides fully up upon the bolt tip that full engagement between their respective threads results. This is illustrated in FIGS. 15 and 19–21.

It will also be noted that the radii of curvature of the threaded walls of the expansion sleeve are out of phase with the radii of curvature of the bolt tip during the early stages of engagement between the bolt tip and the expansion sleeve. This will be seen in FIGS. 6–8. However, when the expansion sleeve is fully engaged with the bolt tip, the radii of curvature of the expansion sleeve will coincide with the radii of curvature of the bolt tip. In this sense expansion sleeve 64 corresponds with the configuration of expansion sleeve 14. Prior to expansion of the expansion sleeve, arcuate parts 72 and 74 have spaced axes of curvature 72a and 74a. When the expansion sleeve is fully expanded, arcuate parts 72 and 74 have a common axis of curvature 73.

The following table of dimensions illustrates the configuration of the inner tapered and threaded portion of expansion sleeve 64, and it will be noted that said expansion sleeve is illustrated in terms of two different angles of taper, one for relatively small diameter bolts and the other for relatively large diameter bolts:

Table of Dimensions of Expansion Sleeve

| Diameter of Bolt | Taper Angle of Sleeve | Length of Sleeve | Root Diameter (Small End of Sleeve) |
|---|---|---|---|
| ¼" | 12 degrees | .400 | .165 |
| ⅜" | 12 degrees | .687 | .215 |
| ½" | 12 degrees | .969 | .250 |
| ⅝" | 8 degrees | 1.062 | .365 |
| ¾" | 8 degrees | 1.187 | .480 |
| 1" | 8 degrees | 1.687 | .610 |

In this form of the invention the tapered and threaded bolt tip has a smaller angle of taper than the expansion sleeve. Specifically, in those cases wherein the angle of taper of the internally tapered and threaded portion of the expansion sleeve is 12°, the angle of taper of the tapered and threaded bolt tip is approximately 6°. In those cases wherein the angle of taper of the internally tapered and threaded portion of the expansion sleeve is 8°, the angle of taper of the tapered and threaded bolt tip is approximately 4°. This relationship of an expansion sleeve angle of taper which is approximately twice the bolt tip angle of taper is the preferred relationship, but it is not intended as a critical limitation upon the invention. A bolt tip angle of taper which is greater or smaller than half the angle of taper of the expansion sleeve will also suffice, provided that the angle of taper of the bolt tip is small enough in relation to the angle of taper of the expansion sleeve to enable the small end of the bolt tip to enter into initial screw-threaded engagement with the expansion sleeve prior to engagement of the main body of the bolt tip with the expansion sleeve. This is illustrated in FIGS. 14 and 16–18 of the drawing. The small end of the bolt tip is shown in FIGS. 14 and 16 to be in engagement with the screw threads of the expansion sleeve. Those portions of the bolt tip which are shown in section in FIGS. 17 and 18 do not engage the screw threads of the expansion sleeve at this time. It is this relationship between the small end of the bolt tip and the screw threads of the expansion sleeve which enables the bolt tip to progressively engage the screw threads of the expansion sleeve and thereby to progressively expand said sleeve.

The results of full engagement between the threads of the bolt tip and the threads of the expansion sleeve are shown in FIGS. 15 and 19–21. The taper of the expansion sleeve has now been modified to conform to the taper of the bolt tip. The radii of curvature of the bolt tip and expansion sleeve which previously were out of phase (see FIGS. 16–18) are now in phase (see FIGS. 19–21). Stated differently, when the bolt tip is in full threaded engagement with the expansion sleeve, the threads of the bolt tip fully engage the threads of the expansion sleeve in longitudinal section (FIG. 15), but they also fully engage the threads of the expansion sleeve in transverse section (FIGS. 19–21). In short, the expansion sleeve is now in phase with the bolt tip in terms of angle of taper, and also in terms of radii of curvature. This results from moving the bolt tip longitudinally in relation to the expansion sleeve (from their respective positions illustrated in FIGS. 13 and 14 to their respective positions illustrated in FIG. 15), and it also results from compressing the two sections of the expansion sleeve between the bolt tip on the one hand and cylindrical wall 78 of bore hole 80 of concrete anchorage 82.

The external configuration of expansion sleeve 64 may correspond to the external configuration of expansion sleeve 14. Thus it may have circumferential ribs 84, 84a and 84b, and it may also have radially extending projections 86, 86a, 86b and 86c. These circumferential and radial formations are forced into the wall of the anchorage bore hole when the expansion sleeve is expanded by the bolt tip (see FIG. 15).

I claim:

1. An expansion anchor, comprising:
   a. a bolt and an expansion sleeve therefor,
   b. said bolt consisting of a generally cylindrical shank, a conically tapered and threaded tip at the lower end of the shank and torque tool engageable means at the upper end of the shank,
   c. said conically tapered and threaded bolt tip being circular in cross-section at all points along its longitudinal axis, with progressively increasing radii of curvature in upward direction,
   d. said expansion sleeve being internally tapered and threaded to receive said conically tapered and threaded bolt tip in screw-threaded engagement therewith,
   e. said expansion sleeve being also longitudinally slit to form a plurality of longitudinally extending parts,
   f. said longitudinally extending parts being arcuately shaped, in cross-section, at all points along the longitudinal axis of the expansion sleeve, with progressively increasing internal radii of curvature corresponding, substantially, to the progressively increasing radii of curvature of the bolt tip in that portion of the bolt tip whereon the expansion sleeve is adapted to be substantially fully engaged and expanded,
   g. the respective radii of curvature of the bolt tip and expansion sleeve along their longitudinal axes being out of phase when the bolt tip initially engages the expansion sleeve and moving progressively into phase as the bolt tip is progressively threaded into the expansion sleeve until the bolt tip is substantially threaded into the expansion sleeve and substantial expansion thereof is attained, at which time their respective radii of curvature substantially coincide.

2. An expansion anchor in accordance with claim 1, wherein:
   a. the internally tapered and threaded expansion sleeve is slit in longitudinal direction to form a plurality of longitudinally extending parts of substantially equal cross-sectional shape and dimensions,
   b. said longitudinally extending parts being resiliently held together by spring means,
   c. said internally tapered and threaded expansion sleeve being adapted to expand radially outwardly against the action of the spring means when engaged in screw-threaded relationship with the conically tapered and threaded bolt tip.

3. An expansion anchor in accordance with claim 2, wherein:
   a. by reason of the resilience of the spring means, the angle of taper of the internally tapered and threaded expansion sleeve is adjustable relative to the longitudinal axis of said sleeve and of said conically tapered and threaded bolt tip,
   b. whereby the internally tapered and threaded expansion sleeve is adapted to conform to the angle of taper of the conically tapered and threaded bolt tip.

4. An expansion anchor in accordance with claim 3, wherein:
   the angle of taper of the longitudinally extending parts, prior to expansion of said internally tapered and threaded expansion sleeve, corresponds, substantially, to the angle of taper of the conically tapered and threaded bolt tip.

5. An expansion anchor in accordance with claim 3, wherein:
   the angle of taper of the longitudinally extending parts, prior to expansion of the internally tapered and threaded expansion sleeve, is approximately twice the angle of taper of the conically tapered and threaded bolt tip.

6. An expansion anchor in accordance with claim 5, wherein:
   a. the angle of taper of the longitudinally extending parts, prior to expansion of the internally tapered and threaded expansion sleeve, is about 8°, and
   b. the angle of taper of the conically tapered and threaded bolt tip is about 4°.

7. An expansion anchor in accordance with claim 5, wherein:
   a. the angle of taper of the longitudinally extending parts, prior to expansion of the internally tapered and threaded expansion sleeve, is about 12°, and
   b. the angle of taper of the conically tapered and threaded bolt tip is about 6°.

8. An expansion anchor in accordance with claim 5, wherein:
   a. the longitudinal dimension of the conically tapered and threaded bolt tip, in relation to the longitudinal dimension of the internally tapered and threaded expansion sleeve, is sufficient:
   b. to enable the small end of said conically tapered and threaded bolt tip to threadedly engage the small end of the internally tapered and threaded expansion sleeve to initiate expansion thereof, and
   c. to enable said conically tapered and threaded bolt tip to fully engage said internally tapered and threaded expansion sleeve to complete expansion thereof.

9. An expansion anchor in accordance with claim 8, wherein:
   the longitudinal dimension of the conically tapered and threaded bolt tip is approximately twice the diameter of the bolt shank.

10. An expansion anchor in accordance with claim 8, wherein:
    the diameter of the small end of the conically tapered and threaded bolt tip does not exceed approximately 58 percent of the diameter of the bolt shank.

11. An expansion anchor in accordance with claim 1, wherein:
    a. the conically tapered and threaded bolt tip defines a substantially constant taper,
    b. the taper and the threading extending substantially the full length of the bolt tip.

12. An expansion anchor in accordance with claim 1, wherein:
    a. each of the longitudinally extending parts of the internally tapered and threaded expansion sleeve defines a substantially constant taper,
    b. the taper and the threading extending substantially the full length of said expansion sleeve.

13. An expansion anchor in accordance with claim 1, wherein:
    a. the internally tapered and threaded expansion sleeve is generally cylindrical in external configuration to conform to a cylindrical bore hole in an anchorage,
    b. the outer diameter of said internally tapered and threaded expansion sleeve, prior to expansion, corresponding substantially to the diameter of the cylindrical shank of the bolt.

14. An expansion anchor in accordance with claim 1, wherein:
    a. the internally tapered and threaded expansion sleeve is provided with longitudinally extending rib elements on its outer surface for engagement with the wall of a cylindrical bore hole in an anchorage,
    b. thereby providing increased resistance to rotational movement of said expansion sleeve when a torque force is applied to the bolt.

15. An expansion anchor in accordance with claim 1, wherein:
    a. the internally tapered and threaded expansion sleeve is provided with circumferentially extending rib elements on its outer surface for engagement with the wall of a cylindrical bore hole in an anchorage,
    b. thereby providing increased resistance to outward axial dislodgment of said expansion sleeve when an outward axial force is applied to the bolt.

16. An expansion anchor, comprising:
    a. a bolt and an expansion sleeve therefor,
    b. said bolt consisting of a generally cylindrical shank, a conically tapered and threaded tip at the lower end of the shank and torque tool engageable means at the upper end of the shank, c. said conically tapered and threaded bolt tip being circular in cross-section at all points along its longitudinal axis, with progressively increasing radii of curvature in upward direction,
d. said expansion sleeve being internally tapered and threaded to receive said conically tapered and threaded bolt tip in screw-threaded engagement therewith,
e. said expansion sleeve having progressively increasing internal radii of curvature corresponding, substantially, to the progressively increasing radii of curvature of the bolt tip in that portion of the bolt tip whereon the expansion sleeve is adapted to be substantially fully engaged and expanded,
f. the respective radii of curvature of the bolt tip and expansion sleeve along their longitudinal axes being out of phase when the bolt tip initially engages the expansion sleeve, and moving progressively into phase as the bolt tip is progressively threaded into the expansion sleeve until the bolt tip is substantially threaded into the expansion sleeve and substantial expansion thereof is attained, at which time their respective radii of curvature substantially coincide.

17. An expansion anchor in accordance with claim 16, wherein:
a. the internally tapered and threaded expansion sleeve is longitudinally slit to form a plurality of longitudinally extending parts,
b. means for interconnecting said longitudinally extending parts,
c. said longitudinally extending parts being internally arcuate in cross section and being internally tapered in longitudinal section,
d. said longitudinally extending parts having spaced longitudinal axes of curvature when the expansion sleeve which they comprise is unexpanded.
e. said longitudinally extending parts having substantially coinciding longitudinal axes of curvature when the expansion sleeve which they comprise is substantially fully expanded.

18. An expansion anchor in accordance with claim 16, wherein:
a. the internally tapered and threaded expansion sleeve is generally cylindrical in external configuration to conform to a cylindrical bore hole in an anchorage,
b. the outer diameter of said internally tapered and threaded expansion sleeve, prior to expansion, corresponding substantially to the diameter of the cylindrical shank of the bolt.

* * * * *